United States Patent [19]

Moran

[11] 4,009,690
[45] Mar. 1, 1977

[54] ROTARY INTERNAL COMBUSTION ENGINE

[76] Inventor: George W. Moran, 10532 Berry Knoll, Dallas, Tex. 75230

[22] Filed: July 14, 1975

[21] Appl. No.: 595,578

Related U.S. Application Data

[63] Continuation-in-part of Ser. No. 365,413, May 31, 1973, Pat. No. 3,894,519.

[52] U.S. Cl. .............................. 123/8.45; 418/139; 418/186; 418/234; 418/245; 418/249
[51] Int. Cl.² ......................................... F02B 53/00
[58] Field of Search .......... 123/8.45; 418/139, 186, 418/245, 234, 249

[56] References Cited

UNITED STATES PATENTS

| | | | |
|---|---|---|---|
| 1,677,780 | 7/1928 | Jaworowski | 418/139 X |
| 2,214,833 | 9/1940 | Hocker | 418/186 X |
| 2,628,568 | 2/1953 | Rhine | 418/234 |
| 3,065,708 | 11/1962 | Roth | 418/234 |
| 3,216,406 | 11/1965 | Welm | 418/139 X |
| 3,244,157 | 4/1966 | Tanferna et al. | 123/8.45 |
| 3,539,280 | 11/1970 | Ravera | 123/8.45 X |

FOREIGN PATENTS OR APPLICATIONS

| | | | |
|---|---|---|---|
| 953,027 | 5/1949 | France | 123/8.45 |
| 422,107 | 1/1935 | United Kingdom | 123/8.45 |

Primary Examiner—Carlton R. Croyle
Assistant Examiner—Michael Koczo, Jr.
Attorney, Agent, or Firm—Howard E. Moore; Gerald G. Crutsinger

[57] ABSTRACT

A rotary internal combustion engine comprising an elongated rotor having an oval shaped cross-section secured to a compartmentalized shaft rotatably disposed in an elongated cylindrical shaped bore in a stationary engine block. A plurality of vanes, having a curved wedge-shaped cross-section, are pivotally secured to the block and arranged to move into the cylindrical shaped bore into sealing engagement with the outer surface of the rotor. Fuel and air are delivered through the compartmentalized shaft into chambers between adjacent vanes where fuel is compressed, ignited, and allowed to expand applying torque to the oval shaped rotor. The oval shaped cross-section of the rotor has long sides which are substantially straight and first and second arcuate ends. The first arcuate end of the oval shaped cross-section of the rotor has a radius of curvature which is substantially equal to the radius of the bore in the block such that the first arcuate end is closely spaced from and parallel to the wall of the bore for complete scavenging. The arc length of the first arcuate end of the rotor cross-section and the distance between fuel intake ports and exhaust ports is equal to or greater than spacing between adjacent vanes to isolate fuel intake ports from exhaust ports. The second end of the rotor cross-section has a radius of curvature which is less than the radius of curvature of the first end of the rotor cross-section such that maximum compression is achieved immediately prior to ignition of fuel. Products of combustion and fresh air are delivered to an exhaust compartment in the compartmentalized shaft before exhausting to atmosphere.

4 Claims, 20 Drawing Figures

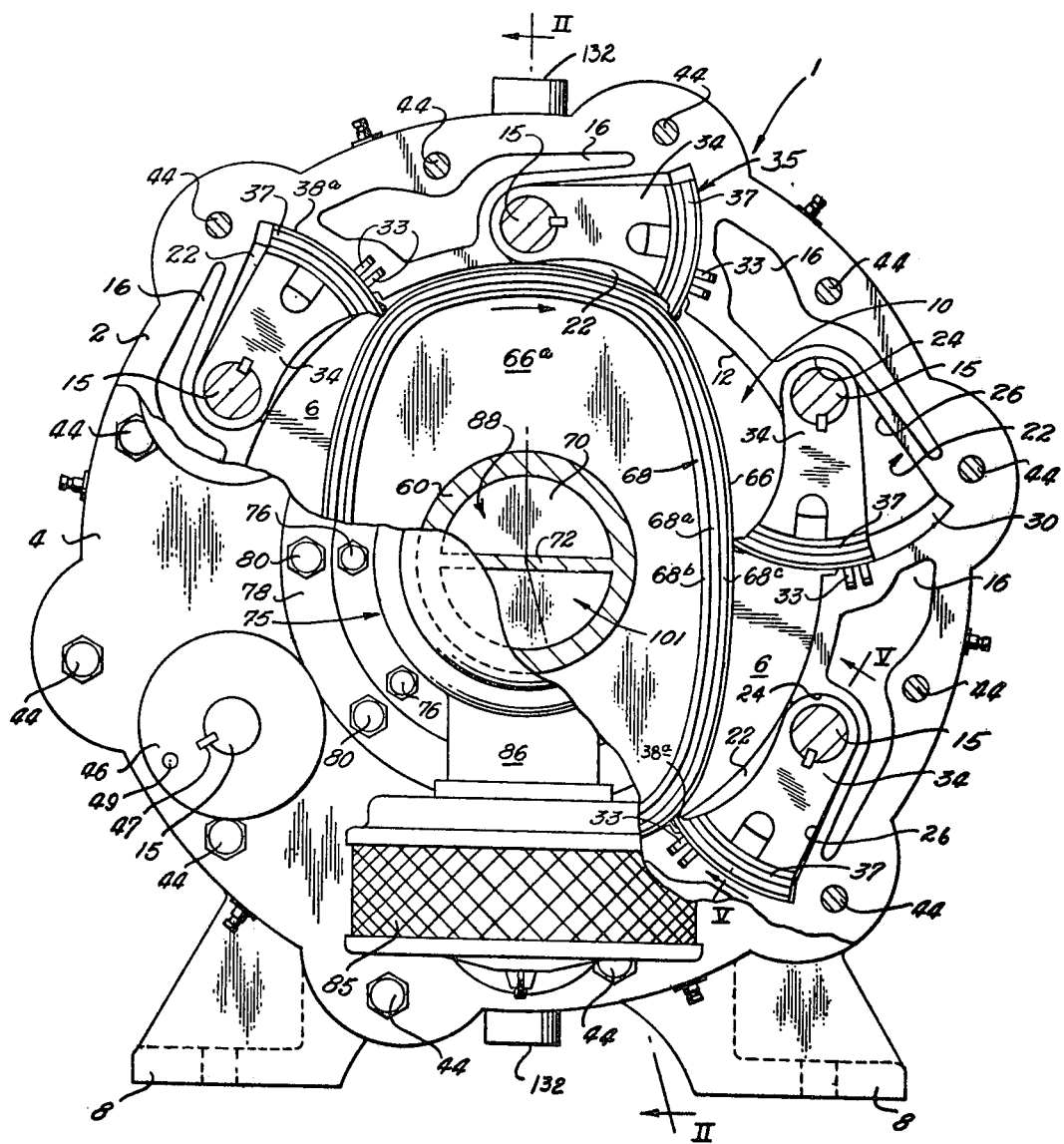
Fig. I

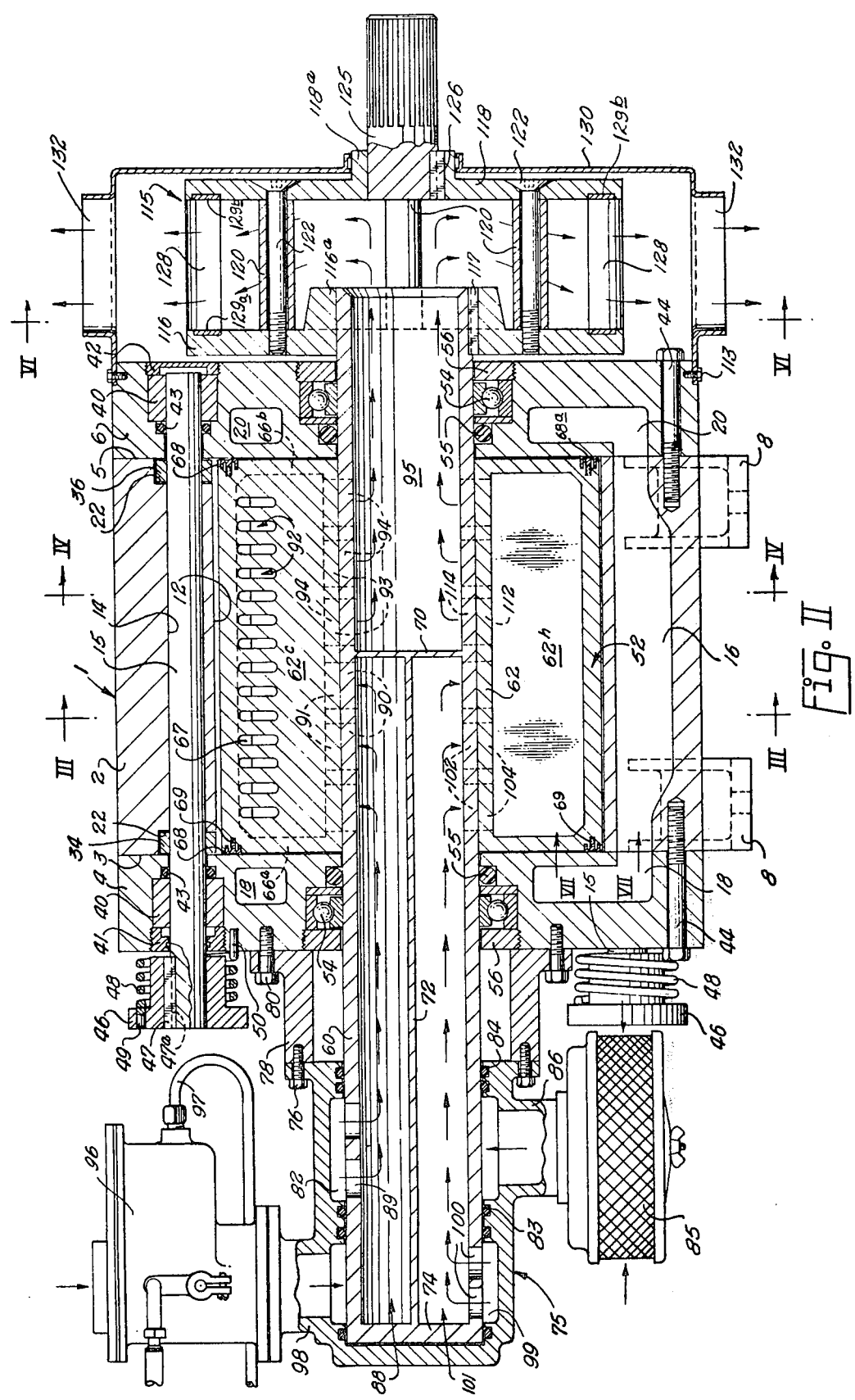

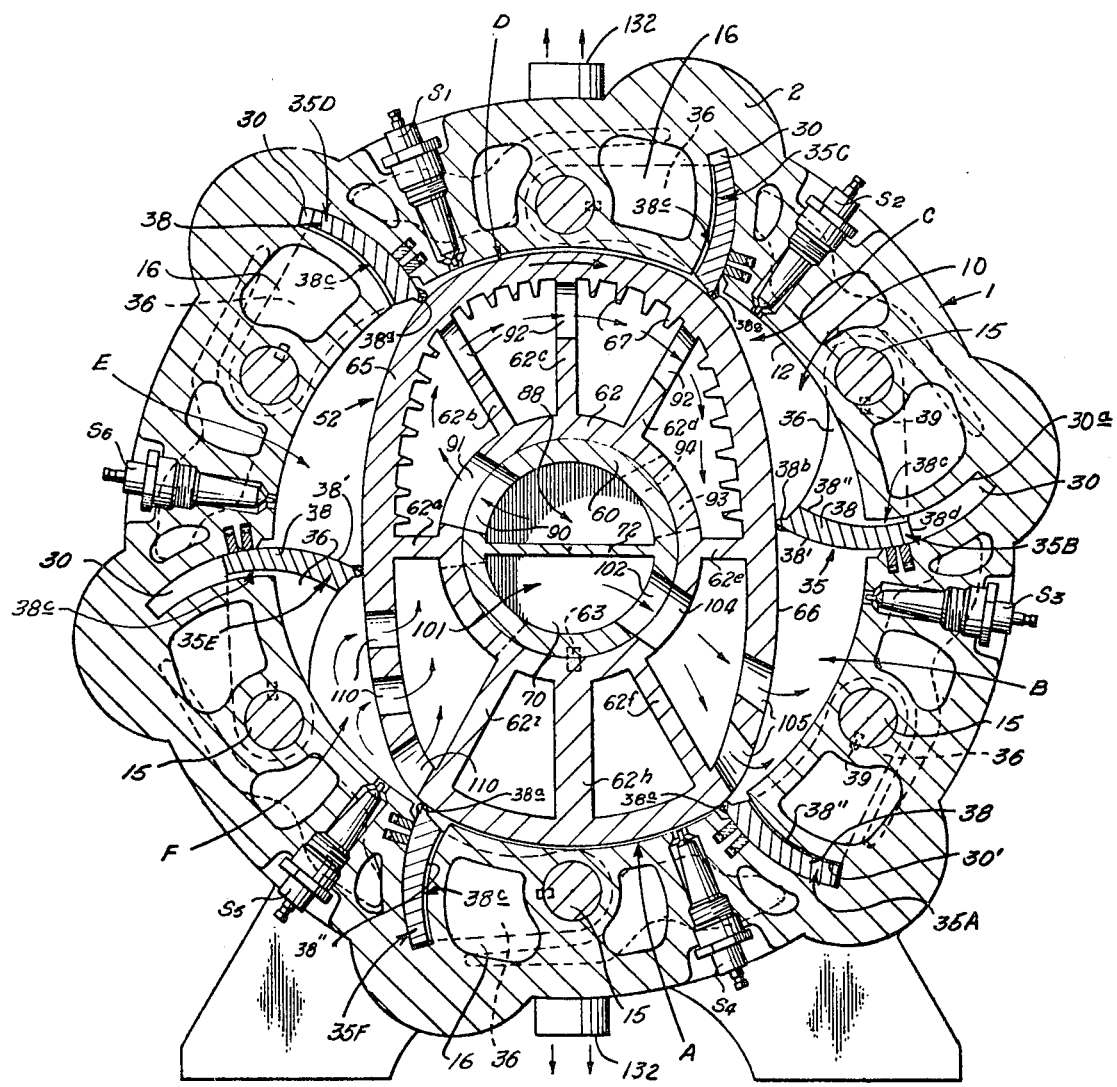
Fig. III

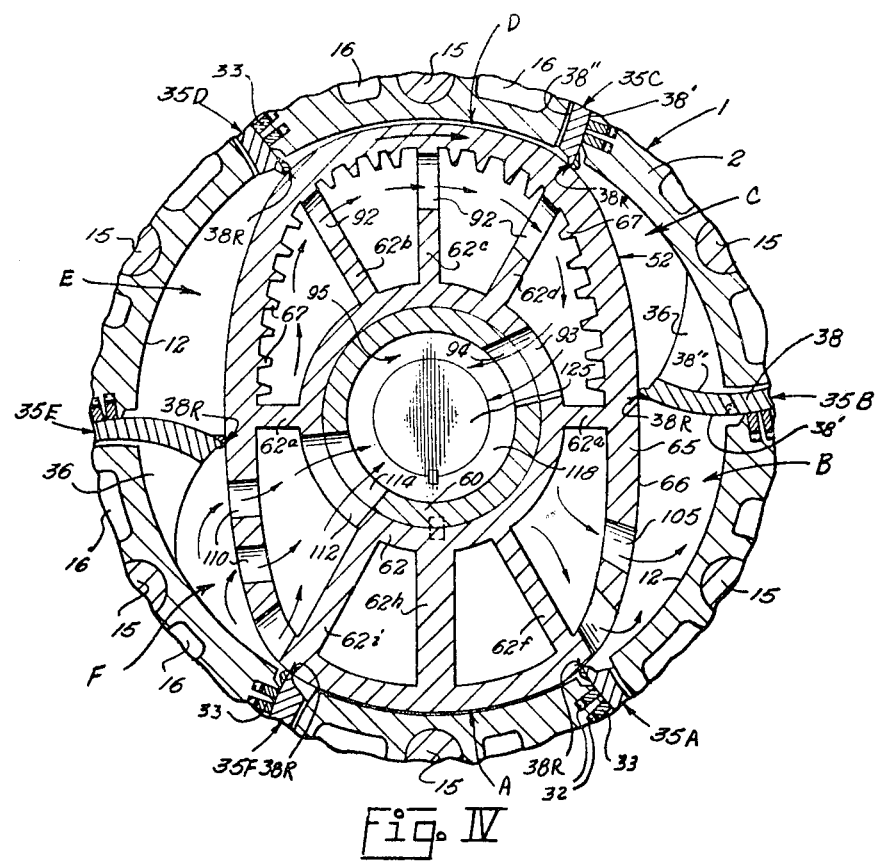
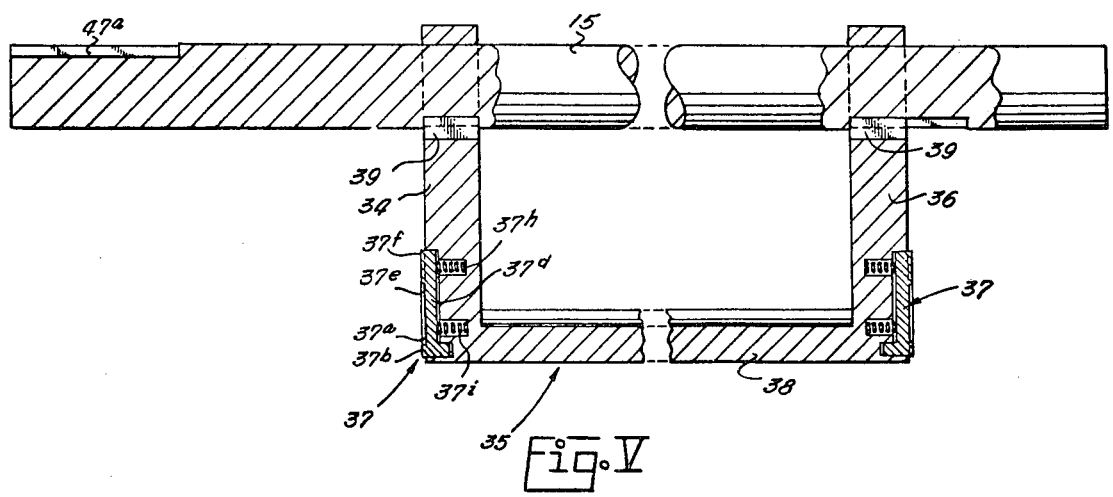

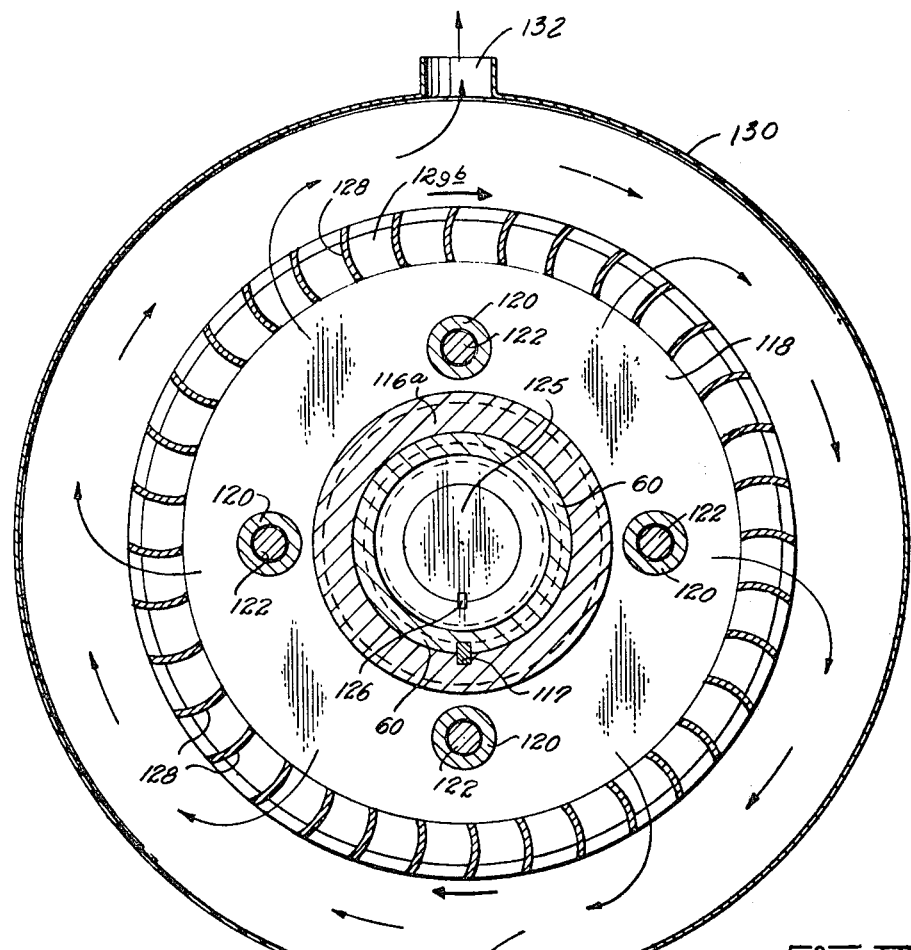
Fig. VI
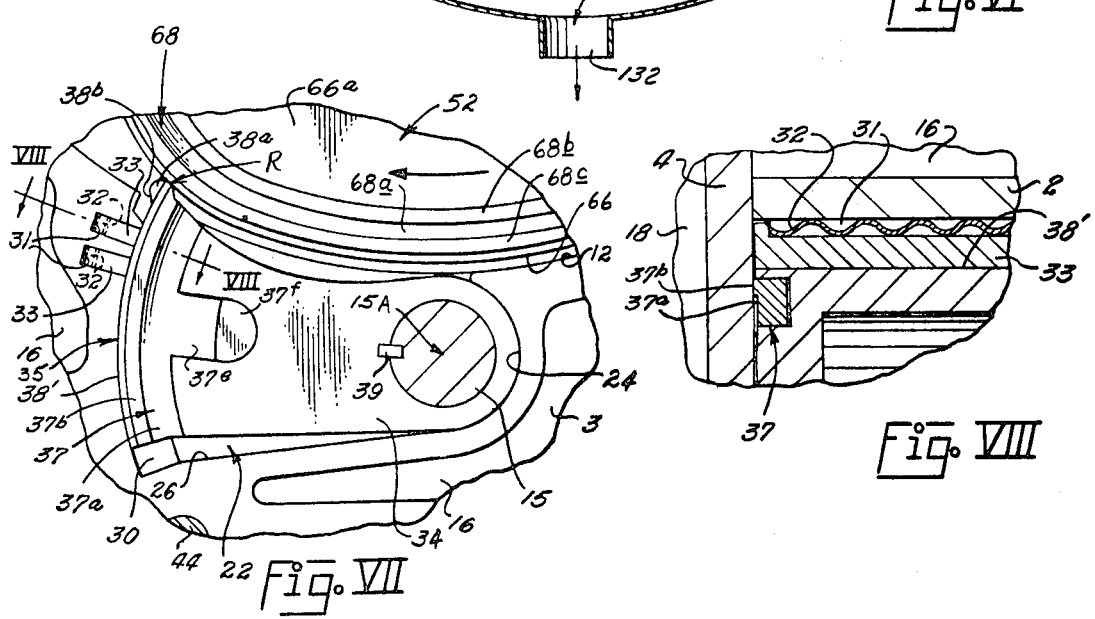
Fig. VII
Fig. VIII

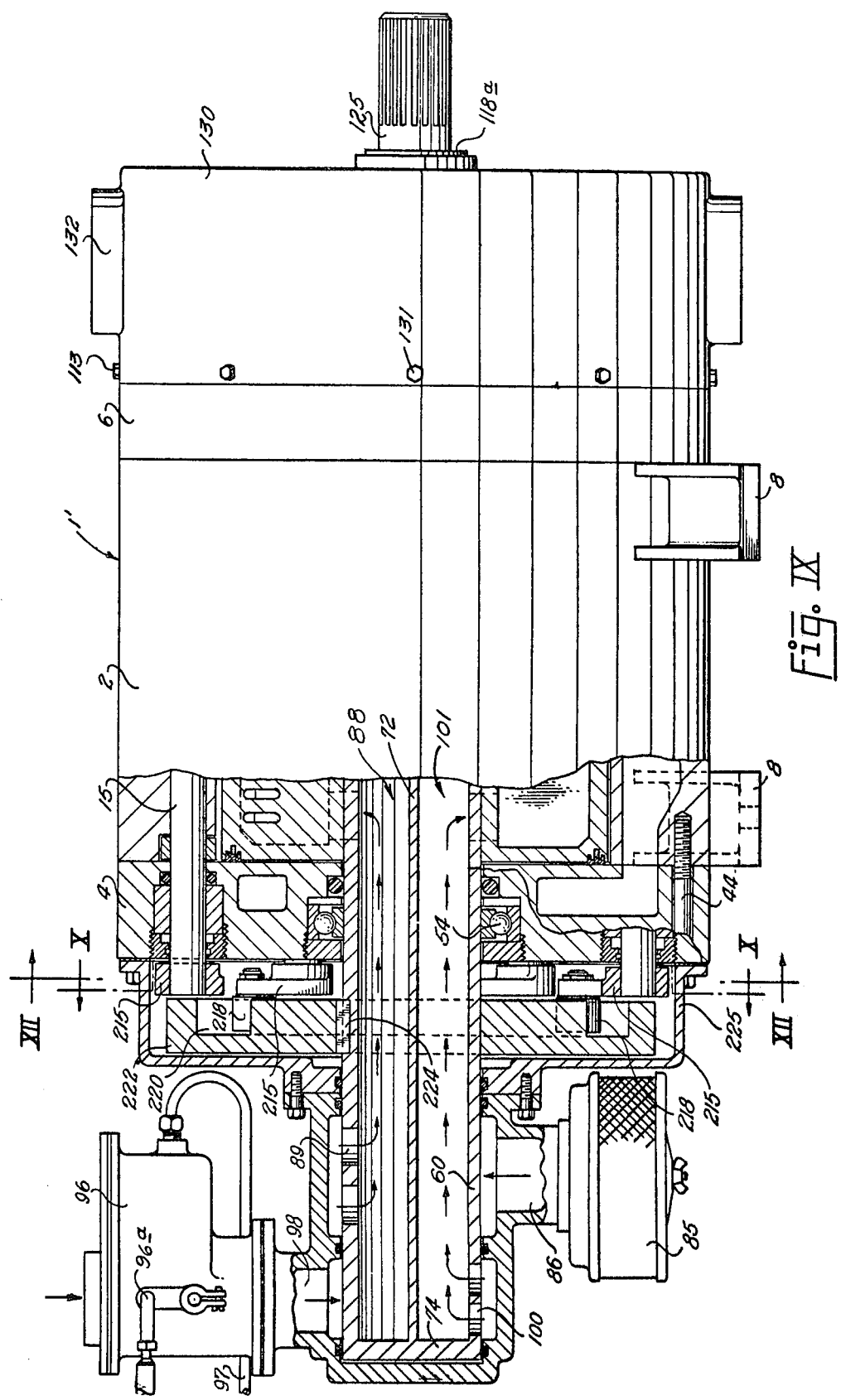
Fig. IX

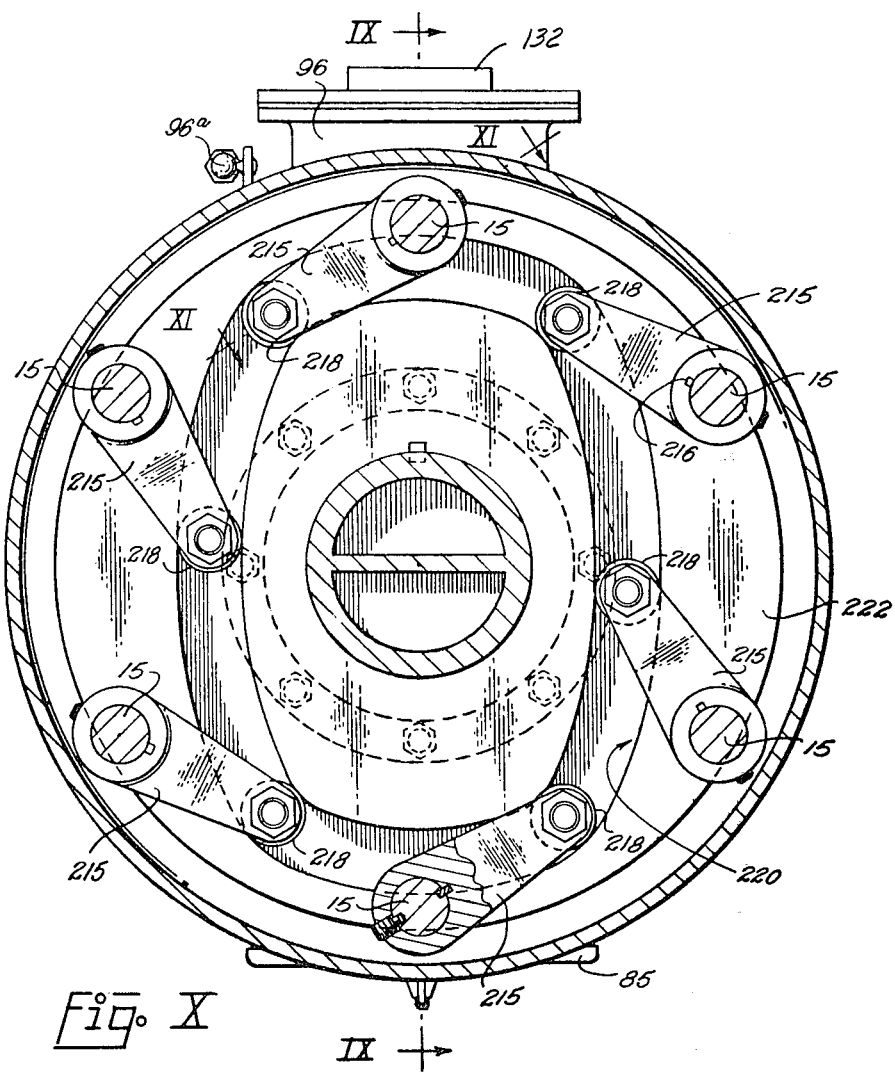
Fig. X
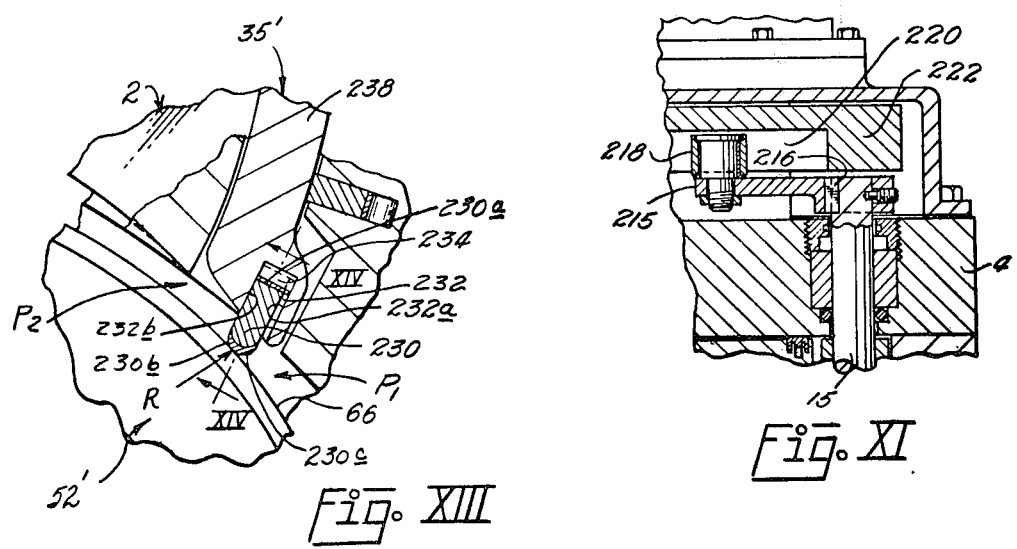
Fig. XIII
Fig. XI

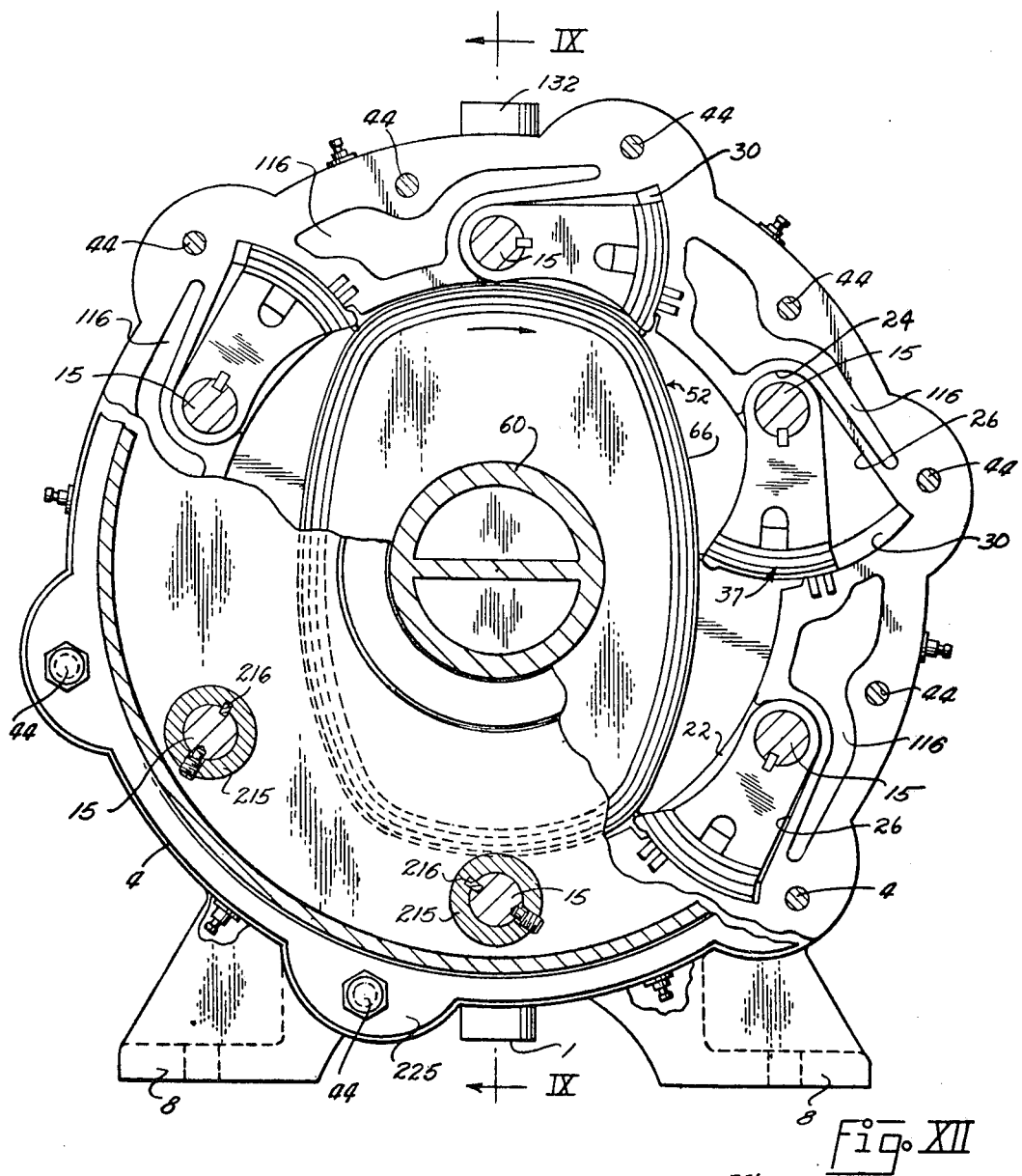
Fig. XII
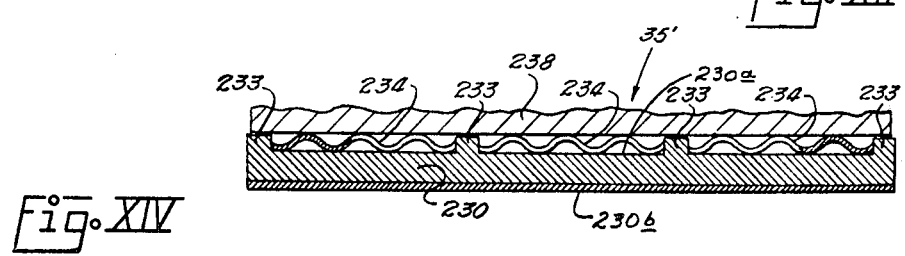
Fig. XIV

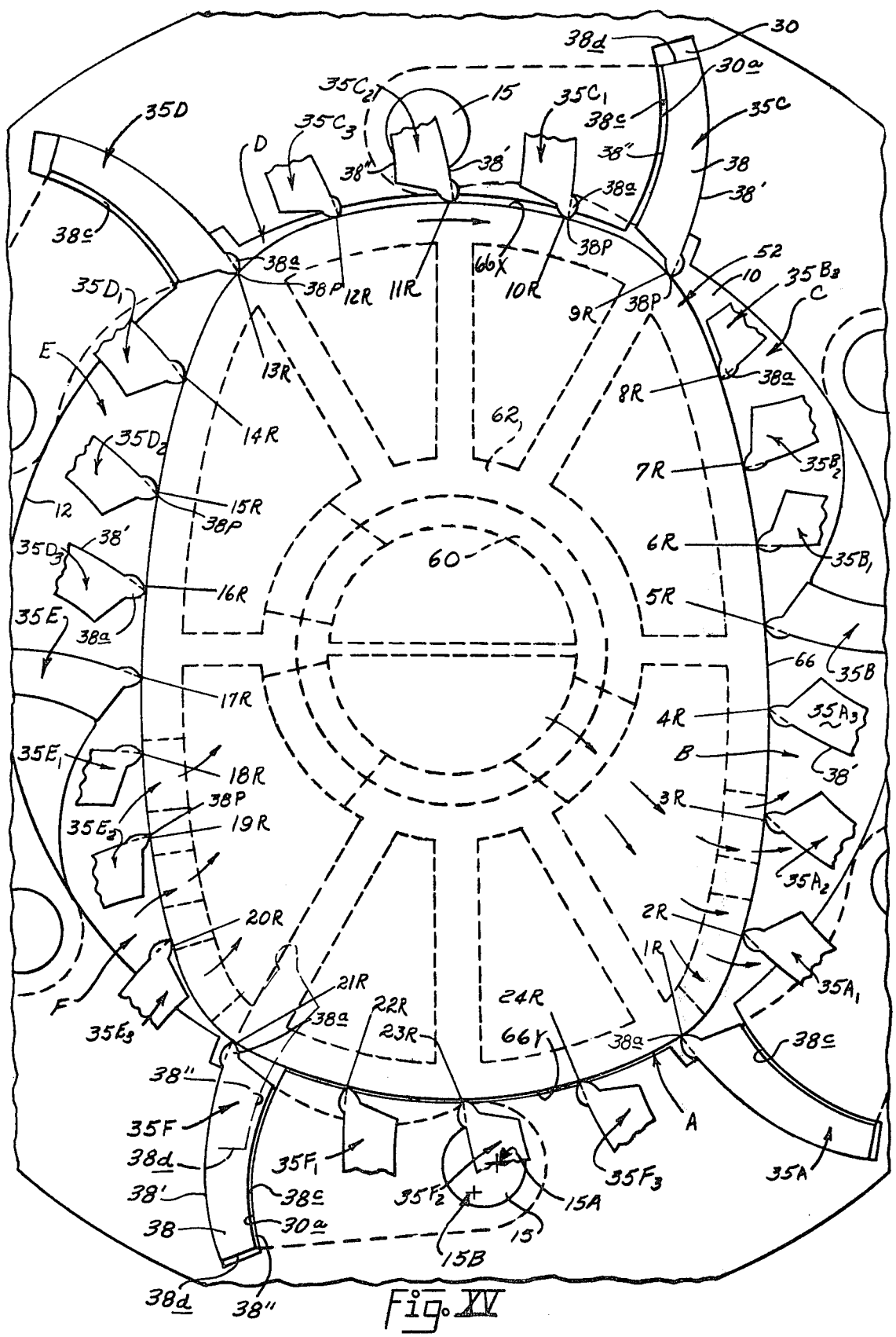
Fig. XV

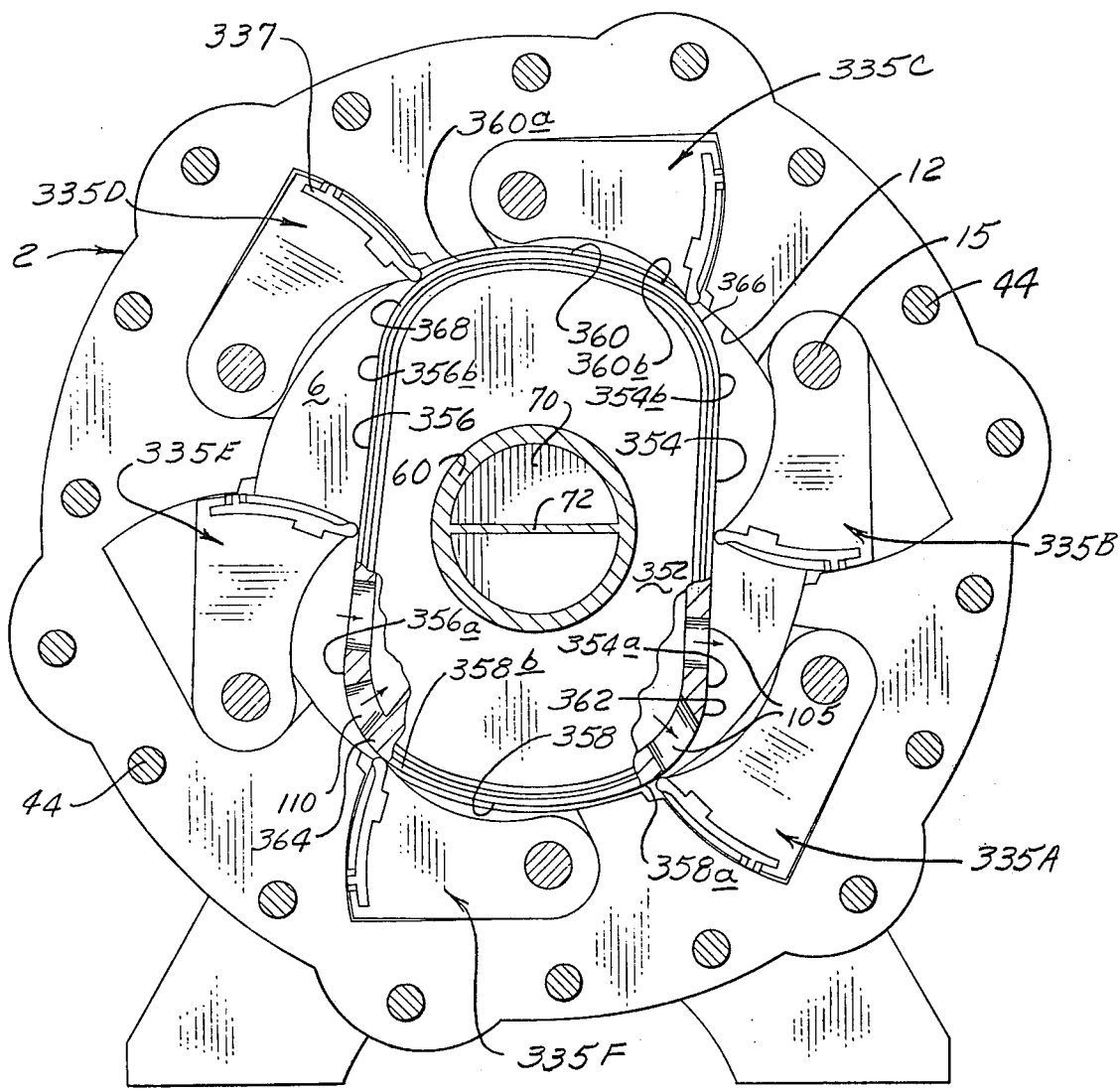
Fig. XVI
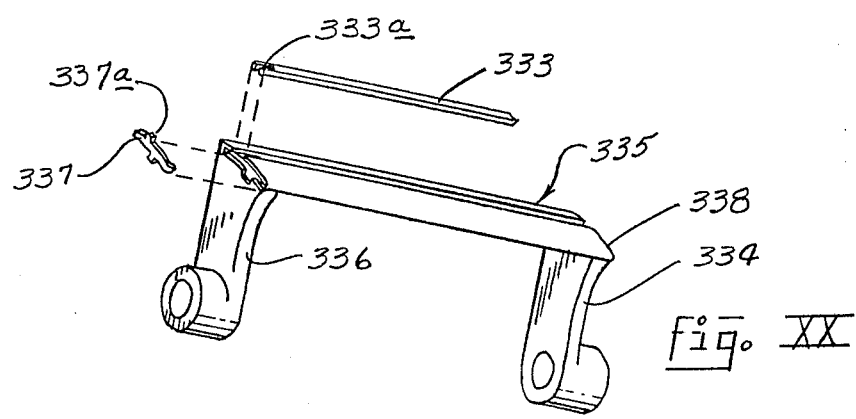
Fig. XX

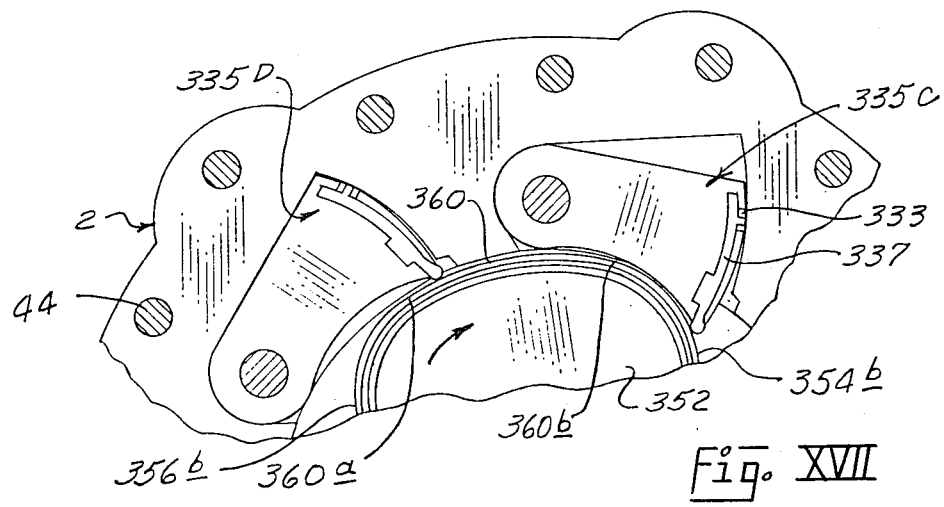
Fig. XVII
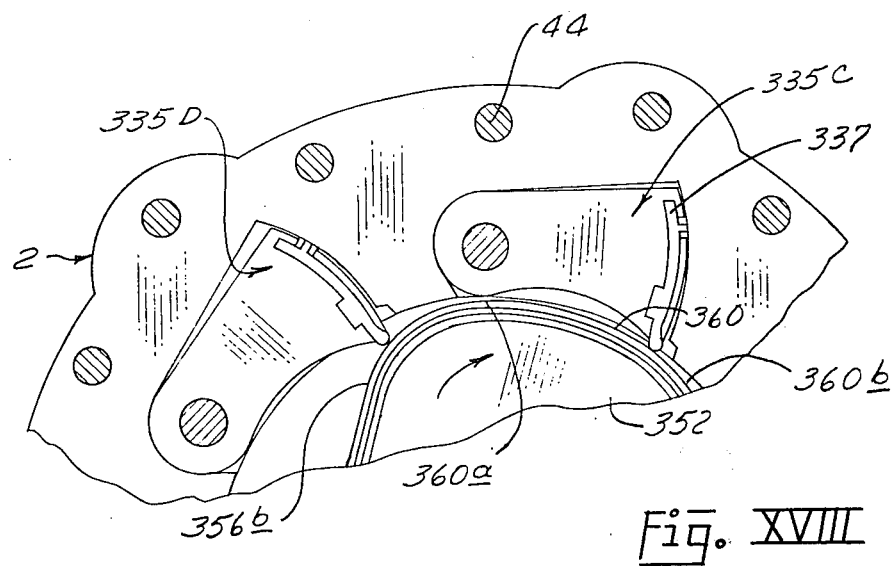
Fig. XVIII
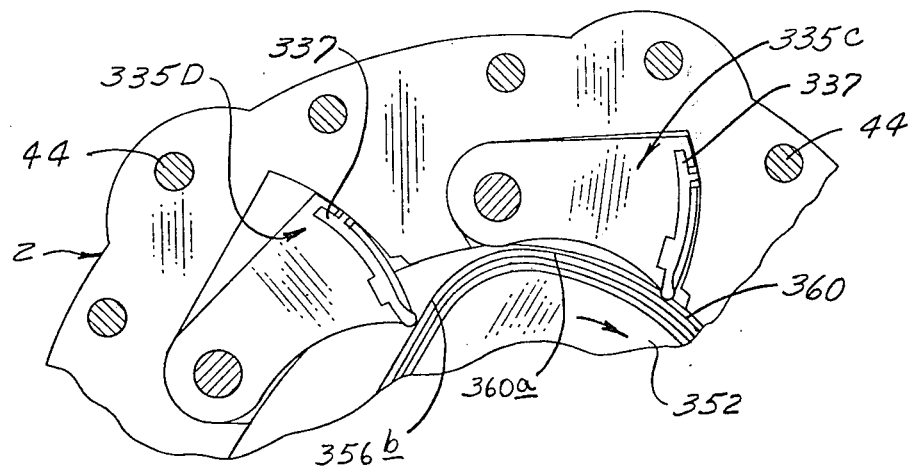
Fig. XIX

ROTARY INTERNAL COMBUSTION ENGINE

CROSS REFERENCE TO RELATED APPLICATION

This is a continuation-in-part of my co-pending application Ser. No. 365,413 filed May 31, 1973, and now U.S. Pat. No. 3,894,519.

BACKGROUND OF INVENTION

Internal combustion engines, those in which fuel is burned in a chamber for transferring energy to an output shaft, have been thermally inefficient.

The most common types of internal combustion engines have employed reciprocating pistons movable through a cylinder completing a cycle comprising fuel intake, compression, expansion and exhaust.

Four stroke cycle engines have substantial mechanical losses in valve operating mechanisms while two stroke cycle engines incur power loss in compressing scavenging medium.

Rotary internal combustion engines were predecessors of the reciprocating internal combustion engine. However, the rotary engine was for many years considered inferior to reciprocating engines. Recent advances in rotary engine design have resulted in development of rotary engines having speeds, weight per unit of power output, and durability comparable to that of reciprocating engines.

Designers of both rotary and reciprocating internal combustion engines have encountered two basic problem areas in which no satisfactory solution has been heretofore devised.

A first problem area involves scavenging the exhaust gases from the combustion chamber before a new charge of fuel is admitted. Incomplete scavenging results in dilution of the fuel-air mixture by residual gases causing incomplete combustion. Incomplete combustion results in reduction in thermal efficiency and discharge of carbon monoxide and hydrocarbons into the atmosphere.

Many engine manufacturers, as a result of the inability to obtain complete combustion in engines, have attached emission control systems for mixing air with exhaust gases creating combustion in the exhaust system in an effort to complete combustion before exhaust gases are released to the atmosphere to minimize air pollution.

The second problem area has involved leakage of fuel during compression and leakage of expanding gas after ignition of fuel in a combustion chamber.

Rotary engines heretofore devised have employed rotors which were eccentrically mounted on a central shaft, or which had vanes movably secured to a rotor which was eccentrically mounted in an opening formed in a rotor housing. Eccentric mounting of the rotor resulted in a dynamic imbalance of forces while moving vanes, spring urged outwardly to obtain a seal at low speeds, were damaged as a result of excessive centrifugal force at high speeds which caused excessive stress and frictional wear.

SUMMARY OF INVENTION

I have devised an improved rotary internal combustion engine having a substantially oval shaped rotor dynamically balanced about a central axis having an outer surface engageable by sealing surfaces on pivotal vanes secured to a stationary rotor housing having a cylindrical bore disposed therein.

Pressure between contacting surfaces of the vanes and the rotor is not affected by the speed of rotation of the rotor.

The rotor is shaped such that minimal clearance exists between the surface of the rotor and surfaces of the bore in the rotor housing to minimize the chamber volume capable of being occupied by exhaust gases, thus assuring substantially complete scavenging and minimizing dilution of fresh charges of fuel.

The vanes pivotally secured to the rotor housing are shaped such that pneumatic forces within the chambers to be sealed are employed during the compression and power cycle for urging the vanes into sealing relation with the surface of the rotor. Thus, as pressure increases the sealing capacity is increased.

Air and fuel-air mixtures are delivered through a compartmentalized central shaft upon which the rotor is mounted to provide cooling of surfaces of the rotor, to preheat the fuel-air mixture to insure vaporization of the fuel, and to provide a supercharging effect as a result of centrifugal force.

A primary object of the invention is to provide an internal combustion engine capable of scavenging substantially all of the products of combustion from combustion chambers without effecting the compression ratio of the fuel-air mixture at the time of ignition.

Another object is to provide an internal combustion engine having an improved rotor, one end of which has a radius of curvature substantially equal to the radius of a bore in which it is rotatably disposed and having an arc length greater than spacing between vanes to isolate intake ports from exhaust ports.

Another object is to provide an internal combustion engine having an improved rotor, one end of which is shaped to control movement of vanes at opposite ends of a chamber in which fuel is compressed to assure that maximum compression is achieved at the instant the fuel is ignited.

Another object is to provide an internal combustion engine incorporating improved seal means to minimize leakage of pressurized gas from the combustion chamber, said seal means being arranged such that any unburned gas that passes adjacent thereto will be burned in an adjacent combustion chamber.

A further object is to provide an internal combustion engine having seal means arranged such that pressure within a chamber is applied to the sealing means such that an increase in pressure results in an increase in the sealing effectiveness of the seal means.

A further object is to provide a rotary internal combustion engine having sealing elements urged into sealing relation with a rotor wherein contacting pressure therebetween is independent of the speed of rotation of the rotor.

A still further object is to provide a rotary internal combustion engine which is dynamically balanced to minimize vibration and wear of component parts thereof.

A still further object is to provide a rotary internal combustion engine having a plurality of combustion chambers arranged for sequential ignition of fuel in the chambers such that torsional force exerted upon the rotor is substantially constant.

Other and further objects of the invention will become apparent upon referring to the detailed description hereinafter following and to the drawings annexed hereto.

DESCRIPTION OF DRAWINGS

Drawings of two preferred embodiments of my invention are annexed hereto so that the invention may be better and more fully understood, in which:

FIG. I is an end view of the rotary internal combustion engine, portions being broken away to more clearly illustrate details of construction;

FIG. II is a cross-sectional view taken substantially along line II—II of FIG. I;

FIG. III is a cross-sectional view taken substantially along line III—III of FIG. II;

FIG. IV is a cross-sectional view taken substantially along line IV—IV of FIG. II;

FIG. V is a fragmentary cross-sectional view taken substantially along line V—V of FIG. I;

FIG. VI is a cross-sectional view taken along line VI—VI of FIG. II;

FIG. VII is an enlarged fragmentary cross-sectional view taken substantially along line VII—VII of FIG. II;

FIG. VIII is a cross-sectional view taken along line VIII—VIII of FIG. VII;

FIG. IX is a fragmentary cross-sectional view similar to FIG. II illustrating a modified form of the invention;

FIG. X is a cross-sectional view taken along line X—X of FIG. IX;

FIG. XI is a fragmentary cross-sectional view taken along line XI—XI of FIG. X;

FIG. XII is a cross-sectional view taken along line XII—XII of FIG. IX;

FIG. XIII is an enlarged fragmentary view of the sealing element between a vane and the rotor;

FIG. XIV is a cross-sectional view taken along line XIV—XIV of FIG. XIII;

FIG. XV is a diagrammatic view illustrating points or lines of contact between surfaces of the vanes and the rotor;

FIG. XVI is a diagrammatic cross-sectional view similar to FIG. III illustrating a modified rotor construction;

FIGS. XVII—XIX are fragmentary views similar to FIG. XVI illustrating movement of vanes upon rotation of the rotor; and FIG. XX is a perspective view of a modified vane construction.

Numeral references are employed to designate like parts throughout the various figures of the drawing.

DESCRIPTION OF A FIRST EMBODIMENT

Referring to FIG. I of the drawing the numeral 1 generally designates a rotor housing comprising a central block 2 having end plates 4 and 6 secured to opposite ends thereof.

Block 2 has suitable anchorage means such as lugs 8 secured thereto for attachment of rotor housing 1 to suitable support means, as by bolts.

Block 2 of rotor housing 1 has a cylindrical bore 10 extending longitudinally therethrough, said bore having a wall 12.

Block 2, in the particular embodiment of the invention illustrated in the drawing has six longitudinally extending passages 14 formed therein, spaced circumferentially about bore 10 to receive rocker shafts 15, as will be hereinafter more fully explained.

Coolant passages 16 extend longitudinally through block 2 and communicate with coolant passages 18 and 20, formed in end plates 4 and 6. Suitable means (not shown) is employed for circulating a suitable medium, such as water, through passages 16, 18 and 20 to dissipate excess heat from rotor housing 1.

End faces 3 and 5 of block 2 have recesses 22 formed therein to receive arms 34 and 36 upon which sealing vanes 35 are mounted as will be hereinafter explained.

Each recess 22 has a semi-circular end 24 and an edge 26 tangentially disposed thereto, such that recess 22 has a wedge-shaped configuration, one side of recess 22 opening into the cylindrical bore 10 extending through block 2. The wide end of recess 22 communicates with a truncated crescent-shaped vane receiving passage 30 having a curved wedge-shaped cross-section, extending longitudinally through block 2. Opposite ends of passage 30 communicate with recesses 22 formed in end faces 3 and 5 of block 2.

As best illustrated in FIGS. III and V vanes 35 comprise arms 34 and 36 secured to opposite ends of a truncated crescent-shaped central portion 38, having a curved wedge-shaped cross-section. Each arm 34 and 36 has an aperture extending therethrough into which rocker shaft 15 extends. Keys 39 prevent rotation of arms 34 and 36 about shaft 15.

As best illustrated in FIG. II end plates 4 and 6 of rotor housing 1 have passages formed therein into which shaft 15 extends. Bearings 40 extend into the openings and are retained therein by retainer rings 41 and 42. Suitable seal means 43 is employed to prevent leakage about shaft 15.

End plates 4 and 6 are secured to the block 2 by bolts 44.

Suitable gaskets (not illustrated) are employed between end plates 4 and 6 and faces 3 and 5 of engine block 2 to prevent leakage of liquid and gas between adjacent surfaces.

Each rocker shaft 15 has a collar 46 detachably secured thereto by a key 47. A spring 48 has a first end 49, secured to collar 46 and a second end 50 secured to endwall 4 such that rocker shaft 15 is urged to a position wherein sealing surfaces 38a adjacent the edge of the central portion 38 of each vane 35 is urged into sealing relation with the outer surface of rotor 52.

Rotor 52 is rotatably disposed in passage 10 extending through engine block 2.

As best illustrated in FIGS. VII and VIII, engine block 2 has spaced grooves 31 formed therein opening into passage 30 through which the central portion 38 of vane 35 extends. Springs 32 extend longitudinally of grooves 31 and urge seal elements 33 into sealing engagement with the convex semi-cylindrical face 38' of truncated crescent-shaped central portion 38 of vane 35.

As best illustrated in FIGS. III and VII the central portion 38 of vane 35 has a sealing bead 38a extending along the edge thereof adjacent the convex surface 38', urged into sealing relation with the outer surface 66 of rotor 52 by spring 48.

Sealing beads 38a (FIG. VII) urged against the outside surface 66 of rotor 52 are milled or ground to a curvature such that, as the rotor 52 turns and the vanes 35 oscillate, the line of contact of each bead 38a with the rotor 52 shifts such that pressure of gases in chambers A–F, during the compression and combustion cycles, urge vanes 35 to move toward surfaces 66 of rotor 52, thus intensifying the pressure exerted by springs 48 in holding sealing surfaces on vanes 35 firm against surface 66 of rotor 52.

As illustrated in FIG. XV, the contour of this sealing bead 38a and the contour of the outer surface 66 of rotor 52 are coordinated so that, as the rotor turns and the vanes 35 oscillate, the line of contact between beads 38a and outer surface 66 of rotor 52 shifts in such a way as to cause pressure of the gases in chambers A–F to press vanes 35 toward surface 66 of rotor 52 during most of the compression and combustion cycles and to have no appreciable effect on the movement of the vanes during the intake and exhaust cycles. Just how this takes place is fully explained in the following paragraphs.

To understand how this takes place, however, it is necessary to keep in mind that fluid pressure in each respective chamber A–F (see FIG. III) acts equally against all surfaces within each chamber A–F which includes surface areas of the front and back of each vane 35 and the arms 34, 36, that support them. It is on these surface areas (on the front and back of vanes 35 and arms 34 and 36) that the changing pressures of the gases tend to push the vanes 35 inwardly toward rotor 52 or outwardly away from the rotor 52.

As best illustrated in FIG. XV, tips of sealing beads 38a are milled or ground so that the contour of a cross-section of the tips resembles a rounded V with the apex of the rounded portion coinciding with a projection of the arc of the convex surface 38' of vanes 35. Point 38P in future references, shall indicate the point at which the projection of said arc penetrates the apex of the rounded V portion of sealing bead 38a.

Referring to FIG. XV, it should be observed that this drawing reveals the angle of contact, between sealing bead 38a and surface 66 of the rotor in 24 locations (one every 15°) around rotor 52. This figure also reveals that during one revolution of rotor 52 the line of contact between surface 66 of the rotor and bead 38a of vanes 35 shifts across the face of bead 38a from one side of point 38P to the other side. As illustrated at point 13R on the rotor, point 38P on bead 38a coincides with line of contact between bead 38a and surface 66 of the rotor. At point 9R on the rotor, the contact point between surface of rotor 66 and bead 38a, is inside point 38P (inside a projected arc of convex surface 38' of vanes 35) and that at point 15R on the rotor this contact point is outside point 38P.

Since the line of contact between the face of bead 38a and surface 66 of the rotor is the dividing line between operational chambers A–F, a shifting of this line of contact on the face of bead 38a also shifts areas, exact in extent, on the face of bead 38a from one operational chamber to the other.

When point 38P on the face of bead 38a coincides with the line of contact between sealing bead 38a and surface 66 of rotor 52, as illustrated at point 13R on the rotor, the areas on both the concave and convex side of vanes 35, on which the pressure of adjacent gases tend to press the vane outward (counter-clockwise), are exactly equal to the area of surfaces on which pressure of the gases act tending to press the vanes inward (clockwise). The net result being, no effect on the inward or outward movement of the vanes, this, regardless of whether the gas pressures on each side of vane are equal or unequal.

When the line of contact R between rotor surface 66 and bead 38d is inside point 38P on the face of bead 38a, as illustrated at point 9R, an area on the face of bead 38a, exact in extent, has been shifted from the operational chamber adjacent the concave side 38" of the vane, to the operational chamber adjacent the convex side 38' of the vane, with the result that the areas on the concave side 38" of vane, on which the pressure of the gases tend to press the vane inward, are now greater than the areas, on which the pressure of the gases tend to press the vane outward (counter-clockwise). The net result being an inward (clockwise) force on the vane.

On the convex side 38' of the vane the situation is exactly reversed. The areas, on which the pressure of the adjacent gases tend to press the vane outward are now greater than the areas on which the pressure of the gases tend to press the vane inward (clockwise) with the net result being an outward (counter-clockwise) force on the vane.

When the adjacent gas pressures on both the concave and convex sides of the vane are equal, (as illustrated at points on rotor 18R, 19R, 20R and 2R and 3R) the net result is no in or out pressure on vane. If the pressures are unequal the side of vane adjacent the highest pressure of gas prevails.

When the line of contact between rotor surface 66 and bead 38a is outside point 38P on the face of bead 38a, as illustrated at point 15R, the results are exactly reversed to those expressed in the preceding paragraph. The only thing in common is when the gas pressures on both the concave and convex side of the vane are equal, the result is, no inward or outward pressure on the vane.

When point 38P on sealing bead 38a coincides with the line of contact between sealing bead 38a and surface 66 of rotor 52, the gas pressure on either the concave or convex side of vane has no effect on the in or out movement of the vane.

When the contact line between sealing bead 38a and surface 66 on rotor 52 is inside point 38P on bead 38a the pressure of gases adjacent to concave side 38" of the vane tend to press the vane inward (clockwise) and pressure of gases on the convex side 38' of the vane tend to press the vane outward (counter-clockwise). The side of the vane adjacent the highest pressure of gases prevails.

When the contact line R between sealing bead 38a is outside point 38P, on sealing bead 38a, the pressure of gases on the concave side of the vane tends to press the vane outward (counter-clockwise) and pressure of gases on the convex side of the vane tend to press the vane inward (clockwise). The side of the vane adjacent the highest gas pressure prevails.

When pressure of gases on both the concave and convex sides of vane are equal the pressure of the gases have no effect on the in or out movement of the vane.

Applying these observations to the positions of vanes 35A–35F as drawn in FIG. XV, it is apparent that gas pressure on each side of vane 35A has no effect on its in or out movement for the reason that point 38P and contact line 1R between bead 38a and rotor surface 66 coincide. The same thing applies to vane 35B.

The line of contact 9R between the surface 66 on the rotor and the face of bead 38a of vane 35C is inside point 38P. Since the pressure of gases on the concave side 38" of the vane is greater (the near maximum pressure of the compression cycle) than the gases on the convex side 38' of vane (compression cycle just beginning) the net pressure of gases on vane 35C is inward (clockwise) against the rotor.

The pressure of gases on each side of vane 35D has no effect on its in or out movement for the reason that point 38P and contact line 13R between sealing bead 38a of vane 35D and surface 66 of rotor coincide. The same applies to vanes 35E and 35F.

Assuming the rotor 52 is turned clockwise 15°, vane 35A would then occupy the position $35A_1$, in relation to rotor 52, vane 35B, position $35B_1$, etc. through all vanes through 35F.

In these positions: movement of vane $35A_1$ is not affected by pressure of gases for the reason that pressure is the same on both sides of the vane. Movement of vane $35B_1$ is not affected by pressure of gases for the reason that point 38P on bead 38a coincides with the line of contact 6R between bead 38a and surface 66 of rotor 52.

Net pressure of gases on vane $35C_1$ is inward (clockwise) for the reason that the contact line 10R between the face of bead 38a and surface 66 of the rotor is inside point 38P on bead 38a. Gas pressure on the concave side of the vane is higher (in the combustion cycle) than pressure on convex side of vane (in mid-compression cycle).

Net pressure of gases on vane $35D_1$ is inward (clockwise) against the rotor for the reason that the contact line 14R between the face of bead 38a and surface 66 of the rotor is outside point 38P on bead 38a. Gas pressure on the convex side of the vane is higher (combustion cycle in first stages) than pressure on the concave side of the vane (combustion cycle almost finished).

Pressure of gases on vane $35E_1$ have no effect for the reason that gas pressure on both sides of the vane are equal. Pressure of gases on vane $35F_1$ have no effect for the reason that point 38P and the line of contact 22R between bead 38a and the surface 66 of the rotor coincide.

Upon turning the rotor clockwise another 15 degrees vane 35A will then occupy the position $35A_2$ in relation to the rotor, vane 35B, position $35B_2$, etc. for all vanes through 35F.

In these positions: movement of vane $35A_2$ is not affected by pressure of gases for the reason that pressure of gases are equal on both sides of vane. Net pressure of gases on vane $35B_2$ is inward (clockwise) for the reason that contact line 7R between the face of bead 38a and surface 66 of rotor is inside point 38P on bead 38a and gas pressure on the concave side of vane is higher (in mid-compression cycle) than gases on the convex side of vane (in intake cycle). Net pressure of gases on vane $35C_2$ is inward (clockwise) for the reason that the contact line 11R between face of bead 38a and surface 66 of the rotor is inside point 38P on bead 38a and gas pressure on the concave side 38'' of the vane is greater (in combustion cycle) than gas pressure on the convex side 38' (in mid-compression cycle). Net pressure of gases on vane $35D_2$ is inward (clockwise) for the reason that contact point 15R between the face of bead 38a and surface 66 of rotor is outside of point 38P on bead 38a and the pressure of gases on the convex side of vane is higher (in combustion cycle) than pressure of gases on concave side of vane (in exhaust cycle). Pressure of gases on both sides of vane $35E_2$ have no effect on movement of vane for the reason that gas pressure on both sides is equal. Pressure of gases on vane $35F_2$ have no effect for the reason that point 38P on bead 38a and line of contact 23R between bead 38a and surface 66 on rotor coincide.

Upon turning the rotor still another 15 degrees, vane 35A will then occupy the position $35A_3$ in relation to rotor 52, vane 35B, position $35B_2$, etc. for all vanes.

In these positions pressure of gases on vane $35A_3$ have no effect on movement of the vane for the reason that point 38P on bead 38a coincides with line of contact 4R between bead 38a and surface 66 on rotor.

Net pressure of gases on vane $35B_3$ is inward (clockwise) for the reason that contact line 8R between face of bead 38a and surface 66 of rotor is inside point 38P on bead 38a and the pressure on concave side 38'' of vane is higher (near end of compression cycle) than pressure on convex side 38' of the vane (first stages of compression cycle).

Net pressure on vane $35C_3$ is inward (clockwise) for the reason that the contact line 12R between the face of bead 38a and surface 66 of the rotor is inside point 38P on bead 38a and gas pressure on the concave side 38'' of the vane is higher (in combustion cycle) than gas pressure on the convex side 38' of the vane (in compression cycle).

Net pressure of gases on vane $35D_3$ is inward (clockwise) for the reason that the contact point 16R between the face of bead 38a and surface 66 of the rotor is outside of point 38P on bead 38a and pressure of gases on the convex side of the vane is higher (in combustion cycle) than pressure of gases on concave side of vane (in exhaust cycle).

Pressure of gases on vane $35E_3$ have no effect on movement of the vane because gas pressures on both sides of the vane are equal.

Pressure of gases on vane $35F_3$ have no effect on movement of the vane for the reason that point 38P on bead 38a coincides with line of contact 24R between bead 38a and the surface 66 of the rotor.

From the foregoing it is evident that pressure of the gases in the operational chambers A–F press the vanes inward (clockwise) at points 7R, 8R, 9R, 10R, 11R, 12R, 14R, 15R, 16R on the rotor, which includes most of the compression and combustion cycles, and that at points 1R, 2R, 3R, 4R, 5R, 6R, 13R, 17R, 18R, 19R, 20R, 21R, 22R, 23R, and 24R, pressure of the gases have no appreciable effect on the inward or outward movement of the vanes.

Main bearings 54 and grease seals 55 (FIG. II) are maintained in central openings extending through end plates 4 and 6 of rotor housing 1 by threaded retainer rings 56. A compartmentalized shaft 60 is rotatably disposed in bearings 54 and extends through a central hub 62 of rotor 52.

Shaft 60 and hub 62 are secured together by a key 63.

Rotor 52, as best illustrated in FIGS. I, II, and III, comprises tubular hub 62, having partitions 62a, 62b, 62c, 62d, 62e, 62f, 62h, and 62i, extending radially therefrom supporting an elongated cylindrical member 65, having an oval shaped cross-section.

End walls 66a and 66b extend between outer cylindrical member 65 and central hub 62 of rotor 52.

End walls 66a and 66b have grooves formed therein adjacent the outer periphery thereof for receiving rotor end seals 68 which are urged outwardly by springs 69. Seals 68 have a groove 68a formed in the face thereof such that outwardly extending portions 68b and 68c are disposed in wiping engagement with the inner surface of end plates 4 and 6 of rotor housing 1.

As best illustrated in FIGS. I, V and VII, vanes 35 have seal elements 37 disposed in grooves formed in outer ends of arms 34 and 36. Each seal 37 is curved, having a center of curvature coinciding with the axis 15A of shaft 15 upon which vane 35 is mounted. Seal 37 has a groove 37a formed in the face thereof, such that surface 37b adjacent a side of groove 37a is urged into sealing relation with inner surface of end plate 4.

The central portion of seal 37 has a leg 37d extending radially therefrom, groove 37a being formed intermediate surfaces 37b and 37f. Springs 37h and 37i urge surfaces 37b and 37f into sealing engagement with the end wall 4 of rotor housing 1. Leg 37d prevents movement of seal 37 as arms 34 and 36 oscillate about shaft 15.

Compartmentalized shaft 60 has a transversely extending partition 70 across the longitudinally extending bore. A longitudinally extending partition 72 extends between partition 70 and end closure member 74. An air and fuel intake manifold 75 is secured by bolts 76 to a connector 78, which is secured by bolts 80 to the end plate 4 of rotor housing 1.

Manifold 75 has an annular passage 82 having seal elements 83 and 84 disposed on opposite sides thereof positioned in sealing engagement with the outer surface of shaft 60. An air cleaner 85, preferably comprising a foraminous filter element communicates, through conduit 86, with annular passage 82.

An air intake compartment 88 in shaft 60 is defined by the wall of the shaft, closure member 74, longitudinally extending partition 72 and transversely extending partition 70.

Air intake openings 89 extend through the wall of shaft 60 permitting passage of air from air cleaner 85, through conduit 86, annular air intake pssage 82, and through air intake openings 89 into the air intake compartment 88.

Openings 90 through shaft 60 and are aligned with openings 91 extending through hub 62 of rotor 52.

As illustrated in FIGS. II and III, radially extending partitions 62b, 62c and 62d in rotor 52 have passages 92 extending therethrough, permitting flow of air from air compartment 88 through openings 90, 91 and 92 to air discharge openings 93 and 94, extending through hub 62 and shaft 60 and communicating with exhaust compartment 95.

It should be noted that openings 90 are spaced longitudinally of shaft 60, communicating with passages 94 therethrough on opposite sides of the transversely extending partition 70. Referring to FIG. III, it should further be noted that openings 90 are spaced circumferentially about shaft 60 from openings 94, such that air flowing from air chamber 88 to exhaust compartment 95 in shaft 60 provides cooling of substantially one-half of the interior of rotor 52. Cooling fins 67 on the inner surface of tubular member 65 increase the surface area contacted by cooling air and are preferably formed to dynamically balance the weight of rotor 52 about the axis of shaft 60.

Referring to FIG. II, carburetor 96 meters fuel supplied through fuel line 97 to a supply of air forming a combustible mixture of air and fuel, which is delivered through conduit 98 to annular fuel passage 99 formed in manifold 75. Fuel from annular passage 99 passes through fuel intake openings 100 into fuel compartment 101 in compartmentalized shaft 60. Fuel compartment 101 is defined by the inner wall of shaft 60, transversely extending partition 70, longitudinally extending partition 72, and closure member 74. Openings 102 and 104 extend through the wall of shaft 60 and hub 62, communicating with the inside of rotor 52 between partitions 62e and 62f. Fuel intake ports 105 extend through the wall of cylindrical portion 65 of rotor 52 such that fuel is delivered into chambers A–F defined by the outer surface 66 of rotor 52, the wall 12 of bore 10 extending through block 2, and surfaces 38' and 38" on adjacent vanes 35.

Exhaust ports 110 extend through the wall of cylindrical portion 65 of rotor 52 and communicate with the interior of rotor 52 between radially extending partitions 62a and 62i. Openings 112 and 114 extend through walls of hub 62 and compartmentalized shaft 60 and communicate with exhaust compartment 95.

Exhaust compartment 95 in shaft 60 opens into exhaust manifold 130 secured to the end plate 6 of rotor housing 1 by suitable means such as bolts 113 and having outlet passages 132.

A flywheel 115 comprises discs 116 and 118 secured in spaced apart relation by spacer elements 120 and bolts 122.

Disc 116 has an opening extending therethrough with a collar 116a extending thereabout and is secured to the end of shaft 60 by a key 117.

Disc 118 has an opening extending through a central portion thereof and has a collar 118a thereabout into which the end of power output shaft 125 extends. Key 126 extends into a keyway in the end of shaft 125 and collar 118a.

As best illustrated in FIGS. II and VI fan blades 128 have opposite ends secured to ring elements 129a and 129b secured to discs 116 and 118 of flywheel 115, forming a combination flywheel-blower. Rotation of flywheel 115 imparts air flow outwardly toward outlet passages 132 formed in exhaust manifold 130. Thus, when the engine is operating pressure in exhaust compartment 95 of compartmentalized shaft 60 is below atmospheric pressure such that air is drawn from air compartment 88 through passages inside rotor 52 and exhaust gases are drawn from combustion chambers through ports 110.

SECOND EMBODIMENT

A second embodiment of the invention is illustrated by FIGS. IX–XIV of the drawing.

Numerals hereinbefore employed to designate like parts in the first embodiment are employed in the second embodiment. Only the structure differing from that of the first embodiment will be described.

As illustrated in FIGS. IX and X, each rocker shaft 15 has an arm 215 secured thereto by a key 216, the outer end of each of the arms having a follower roller 218 rotatably secured thereto. Rollers 218 extend into a groove 220 formed in camplate 222 which as illustrated in FIG. IX is connected by a key 224 to compartmentalized shaft 60.

From the foregoing it should be readily apparent that camplate 222, compartmentalized shaft 60 and rotor 52 are rigidly secured together and rotate as a common unit. As cam followers 218 move along groove 220, the sealing edge 38a on each of the vanes 35 is maintained in sealing relation with the outer surface 66 of rotor 52. The centerline of groove 220 is maintained in coinciding relation with the outer surface 66 of rotor 52.

Connector 225, illustrated in FIG. IX, forms a cover about cam disc 222 and arms 215 and is secured to end plate 4 of rotor housing 1' by bolts 44. Connector 225 is partially filled with lubricant providing lubrication for cam groove 220 and follower roller 218.

A modified form of the sealing apparatus for sealing between the edge of each of the vanes 35 and the outer surface 66 of rotor 52 is illustrated in FIGS. XIII and XIV of the drawing. Seal element 230, preferably constructed of suitable material, such as an alloy of carbon and aluminum, is positioned in a groove 232 extending longitudinally on the edge of the central portion 238 of vane 35. Seal element 230 is urged outwardly by corregated leaf springs 234.

As best illustrated in FIG. XIV, seal element 230 has a plurality of shoulders 233 extending outwardly from the backside thereof such that each of a plurality of springs 234 is positionable between the shoulders. Shoulders 233 limit longitudinal movement of springs 234 and prevent the possibility of scoring or scratching faces of end walls 4 and 6.

A slightly modified form of rotor is illustrated in FIG. XVI.

The rotor 352 illustrated in FIG. XVI differs from rotor 52 illustrated in FIG. III of the drawing only in the shape of the exterior surface of the rotor.

Rotor 352 comprises first and second substantially planar surfaces 354 and 356 having edges 354a and 354b and edges 356a and 356b, respectively.

First and second arcuate end surfaces 358 and 360 are formed on opposite ends of the cross-section of rotor 352 and have edges 358a and 358b and 360a and 360b, respectively.

The arcuate end surface 358 is a segment of a cylinder and has a radius of curvature substantially equal to the radius of the bore formed in engine block 2. It should be appreciated that the arcuate end surface 358 is parallel to the wall of the bore 10 extending through engine block 2 and is closely spaced to minimize the volume between the wall of the bore extending through engine block 2, the arcuate end surface 358 and sealing beads on vanes adjacent edges 358a and 358b. It should be noted that spacing between vanes adjacent opposite edges of arcuate end surface 358 are spaced apart a distance substantially equal to the arc length of surface 358 as will be hereinafter more fully explained.

The arcuate end surface 360 has a radius of curvature which is slightly less than the radius of the bore extending through engine block 2. However, end surface 360 has an arc length between edges 360a and 360b which is less than spacing between sealing beads on vanes positioned adjacent opposite ends thereof.

A first transition surface 362 extends between edge 354a of planar surface 354 and edge 358a of arcuate end surface 358. The transition surface 362 has a fuel intake port 105 formed therein.

A second transition surface 364 is secured between edges 356a of the second planar surface 356 and edge 358b of arcuate end surface 358. Transition surface 354 has an exhaust port 110 extending therethrough communicating with the exhaust chamber in the rotor.

A third transition surface 366 has edges secured to the second edge 354b of planar surface 354 and has an edge secured to edge 360b of arcuate end surface 360.

A fourth transition surface 368 has an edge secured to edge 356b of the second planar surface 356 and an edge secured to the edge 360a of end surface 360.

Referring to FIGS. XVII, XVIII and XIX of the drawing, it should be appreciated that when the sealing bead on vane 335c is in the position illustrated in FIG. XVII, sealing bead on vane 335d is in engagement with arcuate end surface 360 such that vane 335d is stationary and vane 335c is being moved upwardly as rotor 352 rotates in the direction indicated by the arrow. Thus, fuel in chamber D is being compressed.

As vane 352 rotates to the position illustrated in FIG. XVIII, the sealing bead on vane 335c passes the edge 360b and is maintained in sealing engagement with arcuate end surface 360. Therefore, vane 335c is maintained in a stationary position. As the edge 360a of end surface 360 moves past the sealing bead on vane 335d the sealing bead moves onto transition surface 368 and vane 335d moves from the position illustrated in FIG. XVII to the position illustrated in FIG. XVIII.

Combustion of compressed fuel in chamber D is preferably initiated when rotor 352 is in the position illustrated in FIG. XVIII while the sealing bead on vane 335d is in engagement with transition surface 368. It should be appreciated that the sealing bead on vane 335d, in the position illustrated in FIG. XVIII, is closer to the center of the bore extending through engine block 2 than is the sealing bead on vane 335c.

Pressure resulting from combustion of fuel in chamber D exerts force on the surface of rotor 352 causing the rotor to be moved from the position illustrated in FIG. XVIII to the position illustrated in FIG. XIX. It should be appreciated that when the rotor is in the position illustrated in FIG. XIX pressure in chamber D is very high. However, vane 335c moving along arcuate end surface 360 is maintained in a stationary position.

A modified seal structure is illustrated in FIG. XX of the drawing.

The vane 335 comprises arms 334 and 336 secured to opposite ends of a truncated crescent-shaped central portion 338, having a curved wedge-shaped cross-section. Each arm 334 and 336 has an aperture extending therethrough into which rocker shaft 15, hereinbefore described, extends.

Portion 338 of vane 335 has a groove extending longitudinally thereof into which a seal element 333 extends. Each end of seal element 333 has a groove 333a formed therein.

Each of the arms 334 and 336 has a groove formed therein to receive seal member 337 having an outward extending projection 337a formed thereon which is received in groove 333a in seal element 333.

A spring element (not shown) urges seal element 333 into sealing engagement with the concave surface in vane receiving groove or passage 30 formed in the engine block 2.

The sealing structure illustrated in FIG. XX is a modified form of the sealing structure illustrated in FIG. VII.

OPERATION

The operation and function of the apparatus hereinbefore described is briefly summarized as follows:

The particular embodiment of the invention illustrated in FIG. III employs six sealing vanes 35 dividing the volume of the bore 10 in block 2 into six chambers designated A, B, C, D, E and F.

Chamber A is the volume between the outer surface 66 of rotor 52, the wall 12 of the bore 10 through block 2, vane 35A and vane 35F. Chamber B is the volume between vane 35A and 35B. The remaining chambers are designated between adjacent vanes in FIG. III.

When the rotor is positioned as illustrated in FIG. III, the rotor 52 rotating in a clockwise direction, Chamber A has been exhausted and the pressure therein is slightly less than atmospheric pressure because of the suction applied thereto as exhaust ports 110 pass between vanes 35A and 35F.

As hereinbefore described, the contour of the outer surface of rotor 52 between lines of contact of sealing beads on vanes 35A and 35F is equivalent to the arc of a circle, the center of curvature coinciding with the axis of compartmentalized shaft 60, which also coincides with the center of bore 10 through block 2. The radius of curvature of the outer surface 66 of this section of rotor 52 is slightly less than the radius of bore 10 through block 2. A minimum length of the arc is the distance between the lines of contact of sealing beads on vanes 35A and 35F when rotor 52 is in the position illustrated in FIG. III. This configuration of the end of rotor 52 allows the rotor to sequentially expel substantially all of the products of combustion from each of the operational chambers A-F as rotor 52 rotates through one revolution.

Chamber B, having been previously evacuated as the enlarged end portion of rotor 52 moved therethrough, is charged with fuel delivered from carbureter 96, through fuel intake compartment 101 of compartmentalized shaft 60 and through openings 102, 104 and fuel intake ports 105.

Fuel previously delivered into chamber C through ports 105 is compressed as rotor 52 decreases the volume thereof.

Fuel in chamber D has experienced near maximum compression. The contour of the end 66x of rotor 52 between lines of contact of vanes 35C and 35D is less than the radius of the opposite end 66y of rotor 52 between lines of contact of vanes 35A and 35F. The contour of the arc between vanes 35C and 35D is designed to provide the desired compression ratio for a particular engine and to encourage the progressive burning of the charge of fuel after ignition.

As rotor 52 moves a few degrees in a clockwise direction from the position illustrated in FIG. III an electrical charge is delivered to spark plug S1 to ignite the compressed charge of fuel-air mixture in Chamber D. As combustion proceeds the pressure of the burning gases greatly exceed the pressure of the compressed fuel-air charge before ignition, driving the rotor 52 in a clockwise direction as viewed in FIG. III, causing the volume of chamber D to be increased.

Chamber E contains burning fuel which is expanding, exerting force on rotor 52, urging the rotor in a clockwise direction.

It should be readily apparent that the volume of chamber E increases near to a maximum just prior to movement of exhaust port 110 into communication therewith for exhausting products of combustion.

Products of combustion in chamber F are being expelled through exhaust ports 110 and exhaust openings 112 and 114 (FIG. IV) into exhaust compartment 95 in compartmentalized shaft 60.

It should be readily apparent that upon rotation of rotor 52 the volume of chamber F will decrease approaching the volume of chamber A as illustrated in FIG. III, thus forcing products of combustion out of chamber F. It should also be appreciated that suction created by rotating blades 128 on flywheel 115 will further reduce pressure in chamber F.

As described hereinbefore, air flowing through air cleaner 85 passes through air compartment 88, through openings 90, 91, 92 and through ports 94 into exhaust compartment 95. Thus, in addition to providing cooling for the segment of rotor 52 adjacent chambers D and E in block 2, adjacent locations of ignition, excess oxygen in the air is mixed with products of combustion in exhaust chamber 95. Mixing burning exhaust gases with an abundant supply of oxygen assures complete combustion of any fuel which may not have been consumed in the combustion chambers D and E to minimize exhausting carbon monoxide and hydrocarbons into the atmosphere through outlet passages 132.

From the foregoing it should be readily apparent that the engine hereinbefore described will dissipate excess heat because engine block 2 is cooled by circulating suitable coolant through passages formed therein while rotor 52 is cooled by circulating air through passages formed therein.

Chambers D and E, when the rotor is positioned as illustrated in FIGS. III and IV form relatively long thin combustion chambers bounded by surfaces adapted to dissipate heat such that temperature in the chambers will be less than that of internal combustion engines heretofore devised and particularly reciprocating piston and cylinder type engines wherein very high temperatures are reached along the axis of the cylinder intermediate opposite ends thereof. Maintaining the maximum temperature of combustion gas within limits discourages formation of nitrogen oxides which pollute the atmosphere.

As rotor 52 turns through one revolution four "cycles of operation" (intake, compression, combustion and exhaust) occur in each of the chambers A-F.

The engine preferably has at least six or more operational chambers A-F and only four cycles of operation, providing an overlap of substantially fifty percent in all cycles. Thus, before the intake cycle, compression cycle, combustion cycle, or exhaust cycle is completed in one of the operational chambers the same cycle has been initiated in the next operational chamber. This overlap of operational cycles in the chambers assures a smooth flow of power and minimizes vibration.

It should be noted also that fuel intake ports 105 and exhaust ports 110 formed in rotor 52 are spaced apart a distance greater than the distance between adjacent vanes 35 to eliminate flow of fuel between intake ports 105 and exhaust ports 110, prior to combustion.

Referring to the first embodiment of the invention illustrated in FIGS. I-VIII of the drawing, the cam type action of the substantially oval shaped rotor 52 pushes the pivoted vanes 35 outwardly against the tension of springs 48 twice during each revolution as the contour of the outer surface 66 of rotor 52 permits. Springs 48 hold sealing beads 38a on tips of central portions 38 of each of the vanes 35 firmly against the smooth outer surface 66 of rotor 52 throughout each revolution of the rotor. Due to this action of the revolving rotor 52 and the springs 48, the capacity of each of the operational chambers A-F alternatively increase and decrease twice during each revolution of rotor 52.

It should be noted that, except to overcome the friction involved, there is no net loss of energy when the rotor 52 pushes the vanes 35 outwardly against the tension of springs 48, since this energy is recovered when the springs 48 push vanes 35 inwardly to maintain contact with surface 66 of rotor 52 as the contour of rotor 52 permits. The shape of rotor 52 and the positioning of vanes 35 thereabout causes rotor 52 to be urged in a clockwise direction by forces equaling those urging the rotor in a counter-clockwise direction.

Except for sealing beads 38a which slide against the outer surface 66 of rotor 52, convex surfaces 38' are milled to conform to an arc of a section of a circle having a center of curvature coinciding with the axis of shaft 15, as has been hereinbefore described.

Inner surfaces 38" of vanes 35, having a truncated crescent-shaped cross-section, are tapered such that surface 38d is thinner than the surface on the opposite side of the blade adjacent which bead 38a is secured. Referring to FIGS. III and XV, it should be appreciated that surface 38', having a center of curvature coinciding with the axis 15A of shaft 15, is not parallel to the inner surface 38". The radius of curvature of surface 38" is less than the radius of curvature of surface 38' and the center of curvature 15B of concave surface 38" lies a greater distance from the wall 12 of bore 10 than does the center of curvature 15A of surface 38' and coincides with the center of curvature of convex wall 30a of groove 30 when vane 35 is in the outermost position.

Passages 30 formed in engine block 2 in which vanes 35 oscillate are milled to conform to the shape of the central portion 38 of each of the vanes 35. It will be appreciated that when the vanes are in the outermost position (see vanes 35A and 35F in FIG. III) the vane receiving passage 30 is evacuated of fluid except for a small open space 38c, due to the taper of the inside 38" of the central portion 38 of vane 35, space 38c widens appreciably as the central portion 38 of the vane moves toward the position of vane 35E, thus allowing gases in operational chambers A–F to flow freely between surfaces 30a and 38" as the vanes oscillate.

Sealing beads 38a (FIG. VII) urged against the outside surface 66 of rotor 52 are milled or ground to a curvature such that, as the rotor 52 turns and the vanes 35 oscillate, the line of contact of each bead 38a with the rotor 52 shifts such that pressure of gases in chambers A–F, during the compression and combustion cycles, urge vanes 35 to move toward surfaces 66 of rotor 52, thus intensifying the pressure exerted by springs 48 in holding sealing surfaces on vanes 35 firm against surface 66 of rotor 52.

In the second embodiment illustrated in FIGS. IX–XIV the cam 222 and follower 218 maintain the edge of vane 238 in close proximity of the surface 66 of rotor 52.

Seal element 230 (FIG. XIII) will be moved laterally across groove 232 by pressure of fluid indicated at P1 and P2. If P1 is greater than P2, seal element 230 will be urged into sealing engagement with surface 232b as illustrated and pressure P1 will urge the seal element into engagement with the surface of rotor 52. The area of surface 230a is greater than the area of curved surface 230c upon which pressure P1 also acts from the point of contact R.

If pressure P2 exceeds pressure P1, seal element 230 is urged against surface 232a and pressure P2 will urge surface 230b into sealing engagement with rotor 52 for the area of surface 230a is also greater than curved surface 230b from the point of contact R.

It should be apparent that the embodiments of the invention hereinbefore described are exemplary of a preferred form of the invention. However, other and further embodiments of the invention may be devised without departing from the basic concept thereof.

Having described my invention, I claim:

1. An internal combustion engine comprising: an engine block having a circular bore extending therethrough; end plates adjacent opposite ends of said engine block, each of said end plates having openings extending therethrough; a shaft; means rotatably securing said shaft in the bore of the engine block such that said shaft extends through said openings in said end plates; a rotor secured to said shaft, said rotor having a substantially oval shaped cross-section and having first and second arcuate end surfaces, said first arcuate end surface having a radius of curvature substantially equal to the radius of said bore such that said arcuate end surface is substantially parallel to the wall of said bore, said rotor having a second arcuate end surface substantially parallel to the wall of the bore but spaced from the wall of the bore a distance greater than the distance the first arcuate end surface is spaced from the wall of the bore; sealing vanes, each of said sealing vanes having a concave surface and a convex surface arranged to form an elongated vane having a curved wedge-shaped cross-section means pivotally securing said vanes to said end plates such that said vanes are pivotable about an axis coinciding with the center of curvature of said convex surface on said vane; said concave surface on said sealing vane having a shorter radius of curvature than the convex surface on said sealing vane and a center of curvature located a greater distance from the wall of said bore in the engine block than the center of curvature of the convex surface of the vane; an arm secured to each end of each of said vanes; means pivotally securing each of said arms to said engine block such that each vane is pivotal about a center of curvature of said convex surface of said vanes; curved wedge-shaped vane receiving grooves in the engine block extending longitudinally thereof and positioned to allow oscillation of said vanes in said grooves said grooves being milled to provide a thin open space between the concave surface of each vane and the inner wall of each groove when the vanes are in the outermost position in the grooves; means to urge said vanes inwardly as the contour of the rotor permits wherein upon rotating the rotor the vanes oscillate in said grooves and due to the curved wedge-shaped cross sections of the vanes and grooves, the said open space between the concave surface on said vanes and the inner wall of the grooves widens appreciably as the vanes move inwardly from their outermost positions thus allowing gases in operational chambers to flow freely between the front and the back of the vanes as they oscillate; means to deliver fuel into space between the wall of the bore and the surface of the rotor intermediate adjacent vanes; means to initiate combustion of fuel in said bore; and means to exhaust products of combustion from said bore.

2. An internal combustion engine comprising: a rotor housing having a cylindrical bore formed therein, said bore having a wall, said rotor housing also having a plurality of vane receiving grooves formed in the wall of the bore and extending longitudinally of the rotor housing, said vane receiving grooves intersecting said bore and being circumferentially spaced about the bore, each of said grooves having a curved wedge-shaped cross-section; a shaft having a central axis; means rotatably securing said shaft in the bore in the rotor housing; a hollow rotor having a substantially oval-shaped cross-section secured to said shaft; a plurality of sealing vanes, each of said sealing vanes having a concave surface and a convex surface arranged to form an elongated vane having a curved wedge-shaped cross-section; an arm secured to each of said vanes; means pivotally securing each of said arms to said rotor housing such that each vane is pivotal about an axis coinciding with the center of curvature of said convex surface on said sealing vane and positioned such that each vane oscillates in one of said vane receiving grooves formed in said rotor housing, each of said grooves having a concave wall having a center of curvature coinciding with the center of curvature of said convex surface on said vane, each of said grooves having a convex wall having a center of curvature which is a greater distance from the central axis of the shaft in the rotor housing than the axis about which the vane is pivoted, said grooves being formed to provide a thin open space between the concave surface on each vane and the convex wall of the groove in which the vane oscillates when the vane is in the outermost position in the groove; means in sealing relation with the convex surface on each vane and the concave wall of each groove; a sealing bead secured to each of said vanes; means to urge said sealing bead on each vane into sliding engagement with the outer surface of said rotor; a first end of said rotor cross-section having a fuel intake port and an exhaust port spaced apart a distance at least as great as maximum spacing between sealing beads on adjacent sealing vanes; a partition in said rotor between said intake port and said exhaust port; a first arcuate surface on said rotor extending between said intake port and said exhaust port, said first arcuate surface being substantially parallel to the wall of the bore through the rotor housing and having a radius of curvature slightly less than the radius of said bore; a second end of said rotor cross-section having a second arcuate surface thereon substantially parallel to the wall of said bore but extending a distance less than maximum spacing between sealing beads on adjacent sealing vanes, said second arcuate surface having a radius of curvature somewhat less than the radius of curvature of said first arcuate surface on the first end of the rotor cross-section thereby forming a compression chamber between adjacent sealing vanes, the wall of the bore, and the second end of said rotor cross-section; said rotor and said sealing vanes being positioned such that upon rotation of the rotor and pivotal movement of said sealing vanes the sealing bead on at least one of the vanes is always in sliding contact with said first arcuate surface on the rotor at some point between the fuel intake port and the exhaust port thereby preventing leakage of gases from one port to the other; means communicating with said hollow rotor to supply fuel through said intake port; means adjacent a first end of each of said compression chambers for igniting fuel therein when a sealing bead on a vane adjacent a second end of said compression chamber is a greater distance from said central axis than a sealing bead on a vane adjacent the first end of said compression chamber; and means communicating with said hollow rotor for exhausting combustion gases flowing through said exhaust port.

3. The combination of claim 2, said means in sealing relation with the convex surface on each vane and the concave wall of each groove comprising: a seal element; and means securing said seal element to said vane such that said seal element is maintained in sealing engagement with said concave wall of the vane receiving groove.

4. The combination of claim 3, said seal element having a groove formed in opposite ends thereof; a seal member having a projection thereon, said projection extending into the groove formed in the end of the seal element; and means securing said seal member to the arm pivotally securing the vane to the rotor housing such that said seal member is maintained in sealing engagement with said rotor housing.

* * * * *